United States Patent
Iskandar et al.

(10) Patent No.: US 11,733,824 B2
(45) Date of Patent: Aug. 22, 2023

(54) USER INTERACTION INTERPRETER

(71) Applicant: Apple Inc., Cupertino, CA (US)

(72) Inventors: Edwin Iskandar, San Jose, CA (US); Ittinop Dumnernchanvanit, Mountain View, CA (US); Samuel L. Iglesias, Palo Alto, CA (US); Timothy R. Oriol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/440,048

(22) Filed: Jun. 13, 2019

(65) Prior Publication Data

US 2019/0391726 A1 Dec. 26, 2019

Related U.S. Application Data

(60) Provisional application No. 62/688,510, filed on Jun. 22, 2018.

(51) Int. Cl.
    *G06F 3/04815* (2022.01)
    *G06F 3/01* (2006.01)
    (Continued)

(52) U.S. Cl.
    CPC .......... *G06F 3/04815* (2013.01); *G06F 3/013* (2013.01); *G06F 3/017* (2013.01);
    (Continued)

(58) Field of Classification Search
    CPC .......... G06F 3/011; G06F 3/017; G06F 3/013; G06F 3/04815; G06F 3/012; G06F 3/016;
    (Continued)

(56) References Cited

U.S. PATENT DOCUMENTS 5,682,506 A * 10/1997 Corby, Jr ................ G06T 17/00
    345/419
9,041,739 B2 * 5/2015 Latta ....................... A63F 13/48
    345/633

(Continued)

FOREIGN PATENT DOCUMENTS

CN    105190485 A    12/2015
CN    107219916 A    9/2017
(Continued)

OTHER PUBLICATIONS

J. Huang, Adrian David Cheok, Shu-Shen Wai, C. Tsai and Shin-Yo Lin, "Portality—The portal between virtuality and reality," 2011 Defense Science Research Conference and Expo (DSR), Singapore, 2011, pp. 1-4, doi: 10.1109/DSR.2011.6026835. (Year: 2011).*

(Continued)

*Primary Examiner* — Dino Kujundzic
(74) *Attorney, Agent, or Firm* — Thompson Hine LLP

(57) ABSTRACT

Various implementations disclosed herein include devices, systems, and methods that provide a CGR environment in which virtual objects from one or more apps are included. User interactions with the virtual objects are detected and interpreted by a system that is separate from the apps that provide the virtual objects. The system detects user interactions received via one or more input modalities and interprets those user interactions as events. These events provide a higher-level, input modality-independent, abstractions of the lower-level input-modality dependent user interactions that are detected. The system uses UI capability data provided by the apps to interpret user interactions with respect to the virtual object provided by the apps. For example, the UI capability data can identify whether a virtual object is moveable, actionable, hover-able, etc. and the system inter- (Continued)

prets user interactions at or near the virtual object accordingly.

20 Claims, 8 Drawing Sheets

(51) Int. Cl.
  *G06F 3/04842* (2022.01)
  *G06F 3/16* (2006.01)
  *G06F 3/04845* (2022.01)
(52) U.S. Cl.
  CPC ...... *G06F 3/04842* (2013.01); *G06F 3/04845* (2013.01); *G06F 3/167* (2013.01)
(58) Field of Classification Search
  CPC .... G06F 3/0346; G06F 3/0304; G06F 3/0482; G06F 3/167; G06F 3/147; G06F 3/048; G06F 3/04842; G06F 16/54; G06F 3/0488; G06F 3/04845
  See application file for complete search history.

(56) References Cited

U.S. PATENT DOCUMENTS

| | | | |
|---|---|---|---|
| 9,317,971 B2* | 4/2016 | Lamb | G06F 3/1431 |
| 9,734,633 B2* | 8/2017 | Bennett | G06T 19/006 |
| 9,754,420 B2 | 9/2017 | Scavezze et al. | |
| 9,911,240 B2 | 3/2018 | Bedikian et al. | |
| 9,916,330 B2* | 3/2018 | Lieberknecht | G06K 9/00442 |
| 10,643,151 B1* | 5/2020 | Jahn | G06F 9/454 |
| 2007/0248261 A1* | 10/2007 | Zhou | G06T 19/006 |
| | | | 382/154 |
| 2007/0291035 A1* | 12/2007 | Vesely | G06F 3/011 |
| | | | 345/427 |
| 2008/0192990 A1* | 8/2008 | Kozakaya | G06K 9/00221 |
| | | | 382/117 |
| 2010/0306670 A1* | 12/2010 | Quinn | G06Q 10/1095 |
| | | | 715/753 |
| 2011/0216060 A1* | 9/2011 | Weising | A63F 13/40 |
| | | | 345/419 |
| 2011/0310002 A1* | 12/2011 | Tidemand | G06F 3/016 |
| | | | 345/156 |
| 2012/0005624 A1* | 1/2012 | Vesely | G06F 3/012 |
| | | | 715/808 |
| 2012/0092328 A1* | 4/2012 | Flaks | G02B 27/017 |
| | | | 345/419 |
| 2012/0162384 A1* | 6/2012 | Vesely | G06T 19/006 |
| | | | 348/47 |
| 2012/0264510 A1* | 10/2012 | Wigdor | G06F 3/011 |
| | | | 463/31 |
| 2013/0083173 A1* | 4/2013 | Geisner | G06F 3/1423 |
| | | | 348/51 |
| 2013/0169680 A1* | 7/2013 | Chien | G06F 3/04815 |
| | | | 345/633 |
| 2013/0234934 A1* | 9/2013 | Champion | G06F 3/012 |
| | | | 345/156 |
| 2013/0307855 A1* | 11/2013 | Lamb | G02B 27/017 |
| | | | 345/473 |
| 2013/0342571 A1 | 12/2013 | Kinnebrew et al. | |
| 2015/0130704 A1 | 5/2015 | Seichter | |
| 2015/0339468 A1* | 11/2015 | Son | G06F 3/017 |
| | | | 726/19 |
| 2015/0356787 A1* | 12/2015 | Abe | G06F 3/0346 |
| | | | 345/633 |
| 2016/0026253 A1* | 1/2016 | Bradski | H04N 13/344 |
| | | | 345/8 |
| 2016/0124499 A1* | 5/2016 | Shiu | H04L 51/24 |
| | | | 715/778 |
| 2016/0253844 A1* | 9/2016 | Petrovskaya | G06Q 50/01 |
| | | | 345/633 |
| 2016/0260261 A1* | 9/2016 | Hsu | B23K 9/173 |
| 2016/0335801 A1* | 11/2016 | Yoon | G06F 3/04842 |
| 2016/0378861 A1* | 12/2016 | Eledath | G06K 9/00718 |
| | | | 707/766 |
| 2017/0004655 A1* | 1/2017 | Scavezze | G06T 19/20 |
| 2017/0038830 A1 | 2/2017 | Clement et al. | |
| 2017/0068323 A1* | 3/2017 | West | G06F 3/0485 |
| 2017/0069134 A1* | 3/2017 | Shapira | G06F 3/011 |
| 2017/0109936 A1* | 4/2017 | Powderly | G06F 3/0482 |
| 2017/0270713 A1* | 9/2017 | Dooley | G06F 9/455 |
| 2017/0273552 A1* | 9/2017 | Leung | G06F 3/011 |
| 2017/0287225 A1* | 10/2017 | Powderly | G06T 19/006 |
| 2017/0329488 A1* | 11/2017 | Welker | G06F 3/011 |
| 2017/0336882 A1* | 11/2017 | Tome | G06F 3/0346 |
| 2018/0046245 A1 | 2/2018 | Schwarz et al. | |
| 2018/0061269 A1* | 3/2018 | Dutta | G09B 9/00 |
| 2018/0082482 A1* | 3/2018 | Motta | G06F 1/163 |
| 2018/0136465 A1* | 5/2018 | Chi | G02B 27/0172 |
| 2018/0150204 A1 | 5/2018 | Macgillivray | |
| 2018/0197347 A1* | 7/2018 | Tomizuka | G06T 19/003 |
| 2018/0307303 A1* | 10/2018 | Powderly | G02B 27/0172 |
| 2018/0330515 A1* | 11/2018 | Stall | G06T 19/003 |
| 2019/0041651 A1* | 2/2019 | Kiemele | G06F 3/011 |
| 2019/0188918 A1* | 6/2019 | Brewer | G06F 3/04815 |
| 2019/0287308 A1* | 9/2019 | Luo | G06F 3/04815 |
| 2019/0318168 A1* | 10/2019 | Meier | G06K 9/00664 |
| 2019/0347846 A1* | 11/2019 | Olson | G02B 27/0101 |
| 2019/0354175 A1* | 11/2019 | Torkos | G06F 3/0304 |
| 2019/0362562 A1* | 11/2019 | Benson | G06K 9/00671 |
| 2019/0369714 A1* | 12/2019 | Pla I. Conesa | G06F 3/011 |
| 2019/0392830 A1* | 12/2019 | Abdollahian | G06K 9/00288 |
| 2020/0019232 A1* | 1/2020 | Rouvinez | G06T 19/006 |
| 2020/0043244 A1* | 2/2020 | Bhushan | G06F 1/1686 |
| 2020/0051337 A1* | 2/2020 | Reynolds | G06F 3/011 |
| 2020/0068045 A1* | 2/2020 | Tomizuka | G06F 9/541 |
| 2020/0073482 A1* | 3/2020 | Levesque | G06F 3/016 |

FOREIGN PATENT DOCUMENTS

| | | |
|---|---|---|
| CN | 107533373 A | 1/2018 |
| DE | 202017105307 U1 | 3/2018 |
| WO | 2017/172982 A1 | 10/2017 |

OTHER PUBLICATIONS

A. Peuhkurinen and T. Mikkonen, "Embedding web apps in mixed reality," 2018 Third International Conference on Fog and Mobile Edge Computing (FMEC), Barcelona, 2018, pp. 169-174, doi: 10.1109/FMEC.2018.8364060. (Year: 2018).*

Frank Steinicke et al., "Object Selection in Virtual Environments using an Improved Virtual Pointer Metaphor," 2006, Springer, Computational Imaging and Vision—Computer Vision and Graphics—International Conference, ICCVG 2004, pp. 320-326. (Year: 2006).*

Shujie Deng et al., "Gaze Modulated Disambiguation Technique for Gesture Control in 3D Virtual Objects Selection," 2017, IEEE, 2017 3rd IEEE International Conference of Cyberkinetics (CYBCONF), pp. 1-8. (Year: 2017).*

Nguyen-Thong Dang, "A Survey and Classification of 3D pointing Techniques," 2007, IEEE, 2007 IEEE International Conference on Research, Innovation and Vision for the Future, pp. 71-80. (Year: 2007).*

Abidin, Rimaniza Zainal, Arshad, Haslina and Shukri Saidatul A'isyah Ahmad, "Adaptive Multimodal Interaction in Mobile Augmented Reality: A Conceptual Framework", AIP Conference Proceedings 1891, pp. 020150-1-020150-7. (ICAST' 17)(2017).

China National Intellectual Property Administration, Notification of the First Office Action and Search Report (with English translation), Chinese Patent Application No. 201910539613.5, 27 pages, dated Sep. 2, 2021.

China National Intellectual Property Office, Notification of Second Office Action (with English translation), Chinese Patent Application No. 201910539613.5, 12 pages, dated Apr. 13, 2022.

China National Intellectual Property Administration, First Office Action, Chinese Patent Application No. 201910539613.5, 13 pages, dated Sep. 2, 2021.

* cited by examiner

USER INTERACTION INTERPRETER

CROSS-REFERENCE TO RELATED APPLICATION

This Application claims the benefit of U.S. Provisional Application Ser. No. 62/688,510 filed Jun. 22, 2018, which is incorporated herein in its entirety.

TECHNICAL FIELD

The present disclosure generally relates to interpreting sensor data, and in particular, to systems, methods, and devices that interpret user interactions detected via sensor data.

BACKGROUND

Electronic devices are often configured to receive user interactions via multiple different input modalities that involve various sensors. Applications ("apps") are generally programmed or otherwise configured with input-modality-specific instructions to recognize and respond to user interactions detected via one or more of these input modalities. For example, an app may include logic that detects and interprets a selection and movement of a displayed object via a mouse click and mouse movement. Such an app may also include separate logic that detects and interprets a selection and movement of the same object via a hand movement.

SUMMARY

Various implementations disclosed herein include devices, systems, and methods that provide a computer-generated reality (CGR) environment in which virtual objects from one or more apps are included. User interactions with the virtual objects are detected and interpreted by an event system that is separate from the apps that provide the virtual objects. The event system detects user interactions received via one or more input modalities and interprets those user interactions as events. Such input modalities include, but are not limited to, text input detected via keyboard, cursor input detected via mouse or trackpad, touch input detected via touch screen, voice input detected via microphone, gaze/eye-based input detected via light or IR sensors, and hand/movement-based input detected via light or IR sensors.

The events provide higher-level, input modality-independent, abstractions of lower-level input-modality dependent user interactions. Thus, an event (place object X at position Y) could be interpreted based on detecting and interpreting a hand movement from one location to another. The hand's initial location when the movement begins could be used to identify object X and the hand's location when the movement ends could be used to identify position Y. The same event (place object X at position Y) could be interpreted based on detecting and interpreting a voice command, such as "move this right". In the foregoing exemplary voice command, the pronoun "this" and eye/gaze-based tracking data could be interpreted to identify that the user is looking at object X and thus that the word "this" refers to object X. The word "right" could be interpreted to identify position Y, for example, based on assuming a corresponding distance. Processing of such an event is performed using an event system that can be configured with multiple sub-systems for different input modalities.

The event system can interpret user interaction in a CGR environment that has virtual objects from multiple apps on one or more devices. Thus, in some implementations, the event system is configured to detect which virtual object, from amongst potentially many virtual objects from multiple apps on multiple devices, should be associated with an event. Each app provides information about its own virtual objects that are to be included in the CGR environment. The virtual object information can specify the appearance of the virtual object as well as provide UI capability data for the virtual object. For example, the UI capability data can identify whether the virtual object is moveable, actionable, hover-able, etc. The event system uses the UI capability data to interpret user interactions as events. For example, if the system detects a hand movement from an initial location to a final location, the initial location can be used to identify which virtual object to associate with the move event. In one implementation, the system identifies the closest virtual object to that location that is moveable. In other words, if a nearby object is not moveable it will not be selected for the move event and the second nearest object can be selected for the move event instead.

In some implementations, a method is performed at an event system on a device having a processor and a computer-readable storage medium, such as a desktop, laptop, mobile device, tablet, head-mounted device (HMD), etc. The event system displays a view of a CGR environment on a display. The CGR environment includes a virtual object that is provided by a separate app. The app defines an appearance or function of the virtual object and identifies a user interface (UI) capability (e.g., moveable, actionable, hover-able, etc.) of the virtual object to the event system. The event system detects a user interaction with the CGR environment (e.g., detecting a voice command, a hand gesture, an eye-gaze input, a touch input, a keyboard input, a mouse input, etc.).

The event system interprets the user interaction to identify an event (e.g., a move event, an action event, a hover event, etc.) and an object-identifying attribute (e.g., the intended object's location, name, type, etc.) of the user interaction. For example, a voice interpretation subsystem of the event system may identify a move event and a virtual chair that was provided by an app by interpreting "move" and "chair" in a detected voice command "move the chair left." In another example, a hand/movement interpretation subsystem may identify a move event based on hand movement direction and identify the "location" of the object that the user wants to the move based on the hand's initial position. In another example, the hand/movement interpretation subsystem identifies an action event based on a hand movement pattern and identifies the location of the virtual object (e.g., a button) to be actioned based on the hand's position during the movement.

After interpreting the user interaction to identify the event, the event system associates the event with the virtual object based on identifying the virtual object using the object-identifying attribute, if permitted. For example, the system can match the user interaction with the event by determining that the location, name, or type of the user interaction corresponds to the location, name, or type of the virtual object. In addition, the event system only associates the event with the virtual object if the virtual object's UI capabilities permit it. For example, the event system may determine that the virtual object is moveable and thus can be associated with a move event or may determine that the virtual object is actionable and thus can be associated with an action event.

After associating the event with the virtual object, the event system notifies the app of the event. For example, the event system may notify the app that a move event for the app's virtual object has begun and the app can then query the event system for the current location of the virtual object. In another example, the event system notifies the app that an action event for virtual object the has occurred and the app can provide a response to the event system to provide info, change the virtual object, or otherwise respond to the action event. In some implementations, the event system changes the app's virtual object in the CGR environment without being instructed to do so by the app. Thus, if the user interaction moves the virtual object to the right, the event system can move the virtual object to right and separately notify the app of the corresponding move event. The event system thus need not wait for any round-tripping of messages with the app to respond to a user interaction.

The event detection methods and systems disclosed herein provide numerous advantages over prior systems that required input-modality-specific instructions. It can be burdensome to app developers to program input-modality-specific instructions and to update such instructions to accommodate new and changing input modalities. In addition, such apps may not be able to respond quickly enough to user interactions, for example, to display realistic responses. These challenges can be particularly onerous and problematic in the context of CGR environments, e.g., virtual reality (VR) or mixed reality (MR), in which interpreting user interactions can be more complicated and in which quick response to such user interactions can be more critical for realistic experiences.

In contrast, the event system disclosed herein can abstract user interaction data from varied input modalities into higher-level input-modality independent events that can more easily be used by apps. The app or apps that are providing virtual objects used by such a system do not need to include input modality-specific instructions. For example, an app does not need to include hand movement interpretation features, voice interpretation features, touch interpretation features, etc. The app can instead simply include instructions that use the received input-modality independent events. The app also does not need to be updated to accommodate new and changing input modalities that result in the event. Additionally, the event system can be configured to itself change virtual objects using the events, for example moving a virtual object to a new location/orientation in response to detecting a user interaction and without waiting for round-trip messaging with the app. This may provide improved, more realistic responses to user interactions, particularly in the context of CGR environments, e.g., VR and MR, in which interpreting user interactions can be more complicated and in which quick response to such user interactions can be more critical for realistic experiences.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
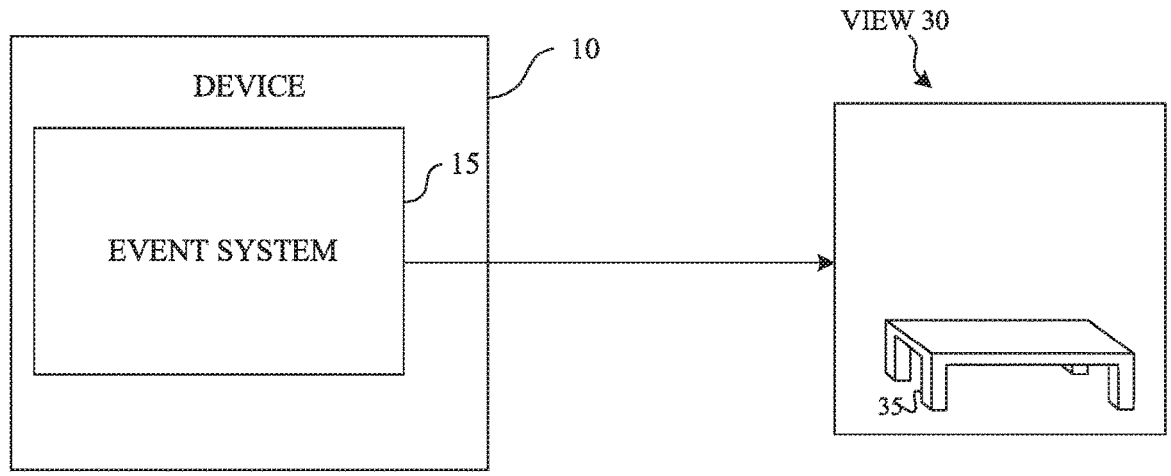
FIG. 1 is a block diagram of an example device including an event system that provides a view of a CGR environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example device 10 is illustrated and includes an event system 15 that provides a view 30 of a computer-generated reality (CGR) environment. A CGR environment refers to a wholly or partially simulated environment that people sense and/or interact with via an electronic system. In CGR, a subset of a person's physical motions, or representations thereof, are tracked, and, in response, one or more characteristics of one or more virtual contents simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual content(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual contents with which a person may sense and/or interact. For example, computer-generated imagery of trees, buildings, and avatars representing people are examples of virtual contents. A person may sense and/or interact with virtual contents in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual contents). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual contents to interact with real objects (that is, physical articles from the physical environment or representations thereof). For example, a system may account for movements so that a virtual tree appears stationary with respect to the physical ground.

Examples of mixed realities include augmented reality and augmented virtuality. An augmented reality (AR) environment refers to a simulated environment in which one or more virtual contents are superimposed over a physical environment, or a representation thereof. For example, an electronic system for presenting an AR environment may have a transparent or translucent display through which a person may directly view the physical environment. The system may be configured to present virtual contents on the transparent or translucent display, so that a person, using the system, perceives the virtual contents superimposed over the physical environment. Alternatively, a system may have an opaque display and one or more imaging sensors that capture images or video of the physical environment, which are representations of the physical environment. The system composites the images or video with virtual contents, and presents the composition on the opaque display. A person, using the system, indirectly views the physical environment by way of the images or video of the physical environment, and perceives the virtual contents superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual contents into the physical environment, for example, as a hologram or on a physical surface, so that a person, using the system, perceives the virtual contents superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual content may adopt a shape or color of a physical article imaged by one or more imaging sensors. As a further example, a virtual content may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual contents into the physical environment, for example, via a hologram or on a physical surface.

In the example of FIG. 1, the view 30 includes a depiction of a CGR environment that includes a table 35. Table 35 can correspond to a real world table, e.g., based on an image sensor on device 10 capturing one or more images of that real world table. Views of a CGR environment can be video-pass-through or optical-see-through. For example, video-pass-through content can include real world content that is captured by a camera and displayed on a display while optical-see-through content can include real world content that is viewed directly or through glass and supplemented with additional displayed content. For example, the device 10 may provide a user with a video-pass-through experience on a display of a cell-phone by integrating rendered three-dimensional ("3D") graphics into a live video stream captured by an onboard camera. As another example, the device 10 may provide a user with an optical see-through experience by superimposing rendered 3D graphics into a wearable see-through head mounted display ("HMD"), electronically enhancing the user's optical view of the real world with the superimposed 3D model.

The event system 15 of FIG. 1 is configured to create and update a CGR environment and provide views, such as view 30, of that CGR environment. In some implementations, the device 10 is configured to obtain (directly via its own image sensor(s) or indirectly via image sensor(s) of other devices) images of the environment. The event system 15 uses these images to provide views of a CGR environment. In some implementations, this involves detecting 3D features (e.g., planes, edges, walls, etc.) in the images so that virtual objects can be added in positions relative to those features or otherwise interact with those features. In some implementations, providing the views of the CGR environment involves estimating a 3D geometry of some or all of the environment that is depicted in the images of the environment. For example, an RGB-D camera or IR camera can provide depth data that is interpreted to estimate a 3D geometry of a room or scene. Such a 3D geometry can be updated, potentially in real time, as the camera/device 10 is moved around and continues to capture new images. Views of the 3D geometry of the environment can then be generated for different viewpoints. In some implementations, the device 10 provides the images of a camera on a display and associates a 3D geometry (e.g., depth values, 3D coordinate values, etc.) with the content of those images.

In some implementations, the device 10 is a head-mounted device (HMD) that is worn by a user. An HMD may enclose the field-of-view of the user. The HMD can include one or more screens or other displays configured to display views of a CGR environment. In some implementations, an HMD includes a screen or other display to display views of the CGR environment in a field-of-view of the user. In some implementations, the HMD is worn in a way that a screen is positioned to display the view of the CGR environment in a field-of-view of the user. In some implementations involving an HMD or other movable device, the viewpoint used in providing the view 30 is based upon the position or orientation of the device 10. Thus, as the user moves his or her body or head and the position and orientation of the device 10 changes, the viewpoint used to display the view 30 also changes. For example, if the user walks around, the user is able to change his or her viewpoint to view the CGR environment from different directions, from closer or farther away, from a top-down observation position and angle, from a bottom-up observation position and angle, etc.

In some implementations, the device 10 is a handheld electronic device (e.g., a smartphone or a tablet) configured to present the views of the CGR environment to first user. In some implementations, the device 10 is a chamber, enclosure, or room configured to present views of a CGR environment in which the user does not wear or hold the device 10.

In some implementations, the device 10 enable a user to change the viewpoint or otherwise modify or interact with the CGR environment. In some implementations, the device 10 is configured to receive user input that interacts with displayed content. For example, a user may add, delete, move, enlarge, select, or change a virtual object that is included in the CGR environment.

User interactions with the CGR environment are detected and interpreted by the event system 15. In one example, a CGR environment includes virtual object that is a painting and the user points a finger at the painting. The event system 15, via sensor data, detects this user interaction and interprets it as an event corresponding to the painting virtual object. In another example, the user provides input by stating "tell me about this painting" and the event system 15, via different sensor data, detects this user interaction and interprets it as the same event corresponding to the painting virtual object.

In FIG. 1, the event system 15 is illustrated as a combined system that integrates the functions of providing views of the CGR environment with the functions of detecting and interpreting events based on sensor data. These functions can be integrated into a single system, application, or module or separated into any number of separate systems, applications, and modules in various alternative implementations.

Figure 2:
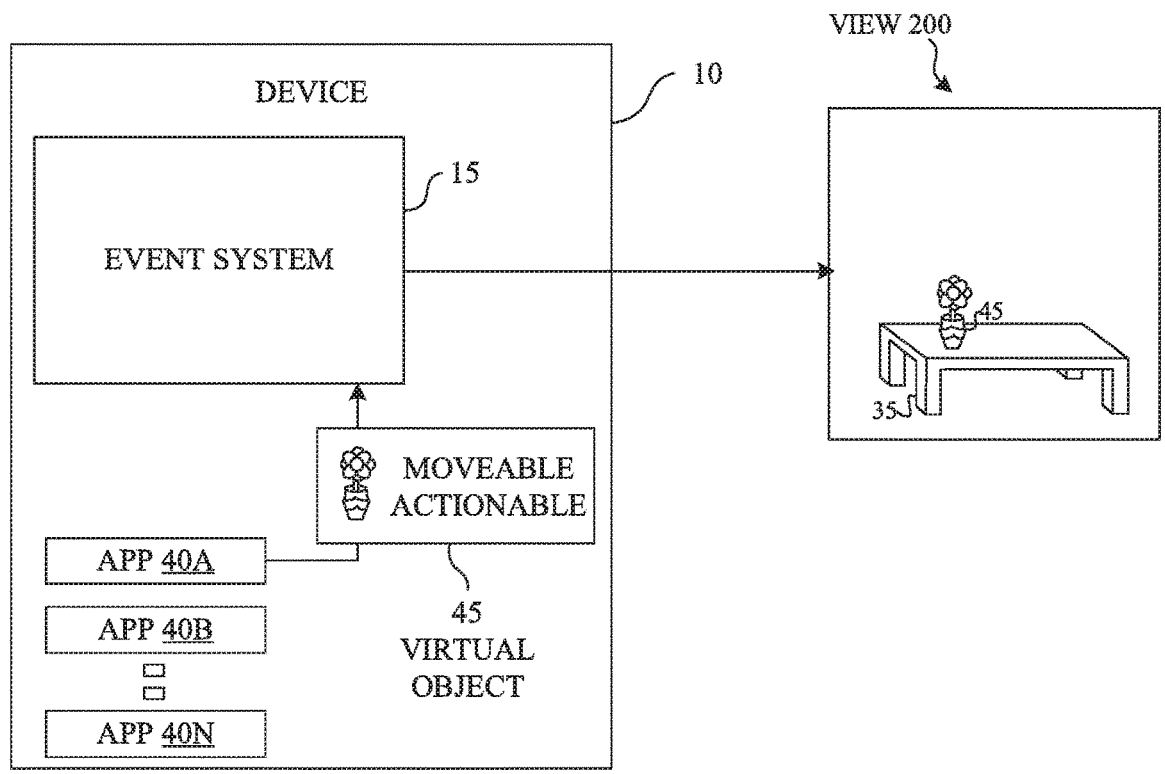
FIG. 2 is a block diagram of the device of FIG. 1 including multiple apps that provide virtual objects to the event system for inclusion in the CGR environment in accordance with some implementations.

FIG. 2 is a block diagram of the device 10 including multiple apps 40a-n that provide virtual objects, such as virtual object 45, to the event system 15 for inclusion in the CGR environment in accordance with some implementations. In this example, the app 40a provides a virtual object 45 including information about the appearance of the virtual object 45. Such appearance information can include a 3D model of the virtual object 45. In some implementations, a 3D model of the virtual object 45 identifies a collection of points in 3D space, connected by various geometric entities such as triangles, lines, curved, surfaces etc. In FIG. 2, the virtual object 45 is added to the CGR environment and depicted in view 200 of the CGR environment on top of table 35.

Virtual object 45 is provided by app 40a to the event system 15 and includes UI capability data indicating that the virtual object 45 is moveable and actionable. This UI capability data is used by the event system 15 in its detection and interpretation of sensor data corresponding to user interactions as illustrated in FIGS. 3 and 4.

Figure 3:
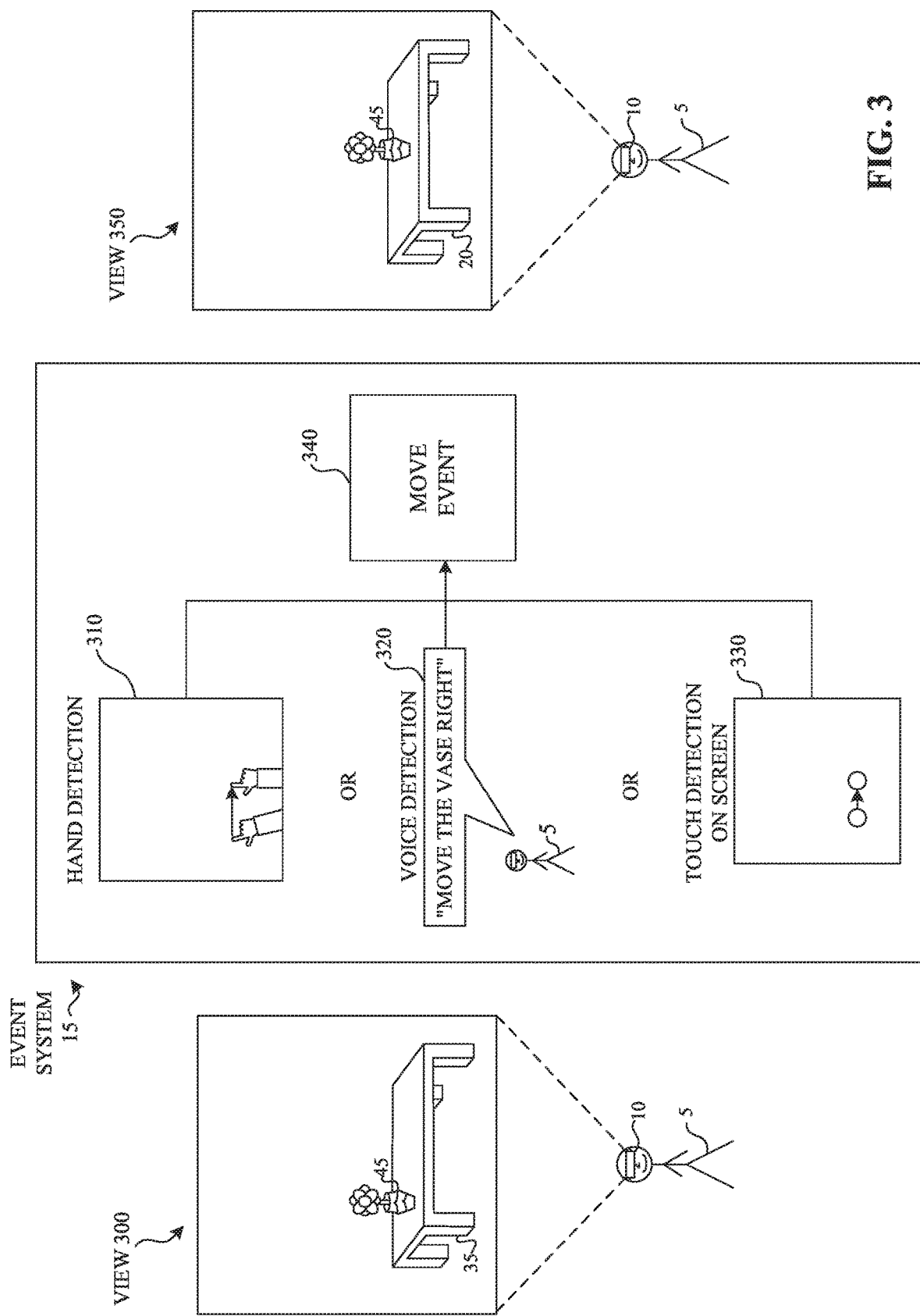
FIG. 3 is a block diagram illustrating the event system of FIG. 2 detecting a user interaction to create a move event and change a view of the CGR environment in accordance with some implementations.
Figure 4:
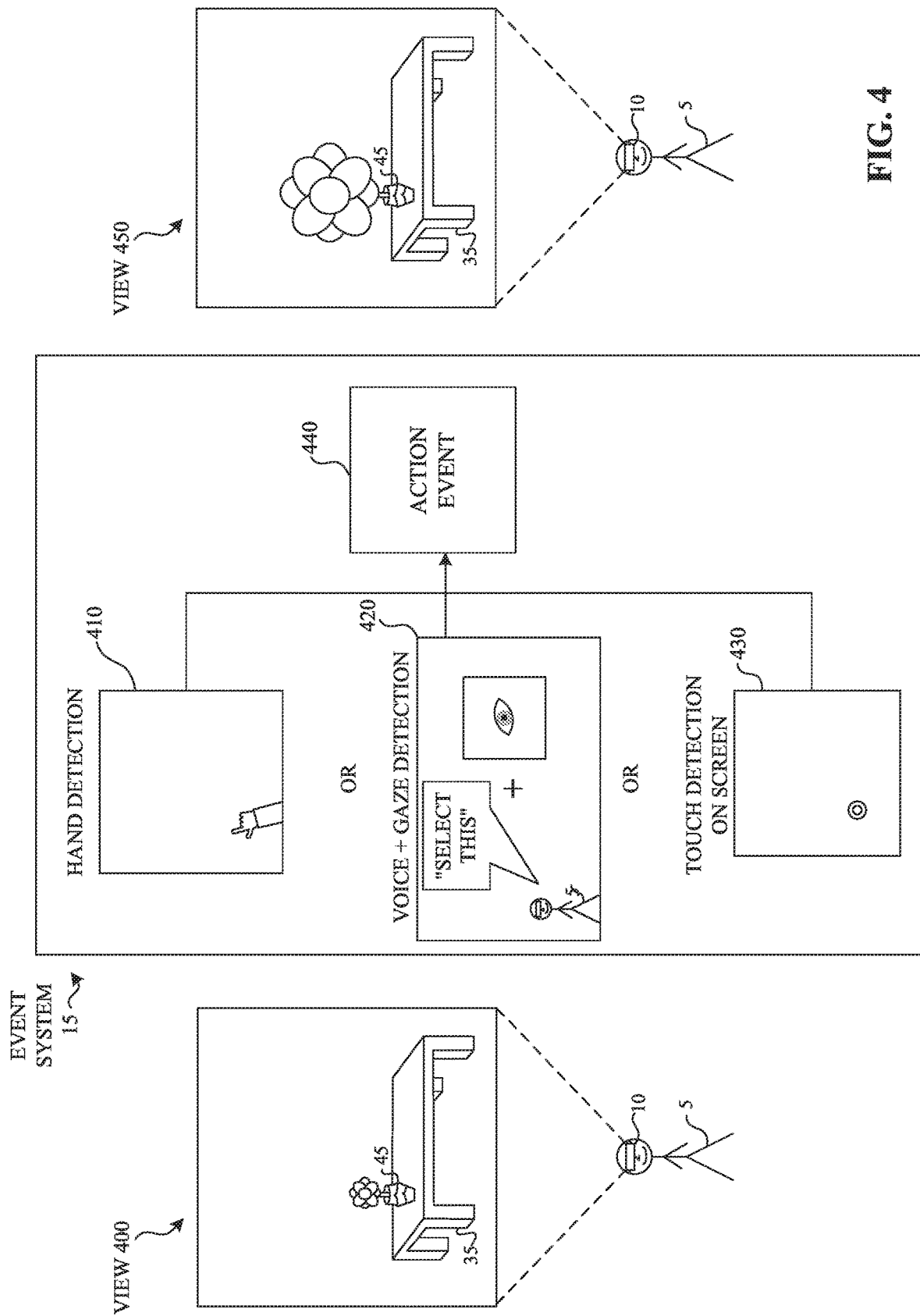
FIG. 4 is a block diagram of the event system of FIG. 2 detecting a user interaction to create an action event and change a view of the CGR environment in accordance with some implementations.

FIG. 3 is a block diagram illustrating the event system 15 of FIG. 2 detecting a user interaction to create a move event and change a view of the CGR environment in accordance with some implementations. In this example, device 10 is a head mounted device (HMD) worn by a user 5. Initially, the user 5 observes view 300 in a display of the device 10. The view 300 of the CGR environment includes the table 35 and the virtual object 45. In this example, the user intends to move the virtual object 45 relative to the table 35. FIG. 3 illustrates three different user interactions that can be interpreted to accomplish this movement. Each of these three different user interactions involves a different input modality but is interpreted by the event system to create the same move event 340. Accordingly, this move event 340 is input-modality independent. An app (e.g., app 40a of FIG. 2) that provides the virtual object (e.g., virtual object 45) that is associated with the event can be notified of the event. The app thus need not itself be configured to interpret interactions in different input modalities or otherwise account for input-modality specific user interactions.

FIG. 3 illustrates the event system 15 detecting a hand movement 310. In this example, the user 5 reaches a hand out to point at the virtual object 45 and then moves his hand to the right (from the user's viewpoint). By this hand gesture, the user intends to identify the virtual object 45 and move the virtual object 45 to the right relative to the table 35 from the user's viewpoint.

The event system 15 may detect this movement via one or more sensors (e.g., a camera, IR sensor, etc.). The event system 15 can be configured to recognize the user's hand using an object recognition technique, including but not limited to, techniques that involve machine learning-based object detection. The event system 15 can be configured to recognize an intention to identify a virtual object, for example, based on detecting that a hand remains relatively steady for at least a threshold amount of time, based on detecting a particular finger position (e.g., a hand with a single finger extended), based on detecting a gesture (e.g., a finger wag), and the like. The event system 15 may be configured to interpret a pointing direction/path associated with a hand or arm and use that direction/path to identify the virtual object. For example, the event system may be configured to identify an orientation of an arm, hand, or finger using an object recognition technique and determine the pointing direction or path based on the view (e.g., the camera pose), the detected pointing direction or path, and the 3D geometry of the CGR environment depicted in the view.

In some implementations, the event system 15 is configured to recognize an event type (e.g., place, action, hover, etc.) by interpreting the hand movement's characteristics. For example, the event system 15 may determine that the hand is moving, that the hand is moving after an initial object identification gesture, that the hand is moving in a particular direction, and the like. In the example of FIG. 3, the event system 15 uses the information about the hand movement to determine that the user intends to move an identified object to a new place. In some implementations, the event system 15 determines whether an event type (e.g., place, action, hover, etc.) is permitted for the virtual object 45. For example, the virtual object 45 may include metadata that identifies that the virtual object 45 is moveable (e.g., move events are allowed) and actionable (e.g., action events are allowed). The event system 15 can use this information to determine whether to associate an event with a virtual object. If an event type is not permitted for a particular virtual object, the event system 15 will not associate events of that type with that virtual object and may instead identify the next closest virtual object for which the event type is permitted to associate with the event.

In some implementations, the event system 15 is configured to recognize an intended end location of an intended movement gesture, for example, based on detecting that a movement of the hand has stopped, e.g., detecting the hand remaining relatively steady for at least a predetermined amount of time following a hand movement. In another example, the event system identifies intermediate locations in a hand movement so that the virtual object can be moved in real time with the hand movement.

After detecting the hand movement via hand detection 310, the event system 15 can change the view of the CGR environment, determine an event (i.e., move event 340), or both. For example, the event system 15 may provide an updated view 350 of the CGR environment that shows the virtual object 45 in its changed location to the right of its previous location from the user's perspective. In another example, the event system 15 provides a sequence of updated views during the movement showing the virtual object 45 moving from its initial position (e.g., as shown in view 300) to an end location (e.g., as shown in view 350).

In some implementations, the event system 15 creates a single event for a movement that identifies the end location of the virtual object 45. In other implementations, the event system 15 creates multiple events corresponding to the movement, for example, identifying one or more intermediate positions during the movement of the virtual object 45.

The move event 340 can include information about the move event 340 that is input-modality independent. For example, the move event 340 may identify the virtual object 45, the app 40a associated with the virtual object 45, that the virtual object 45 is being moved, one or more intermediate location of the virtual object 45 in the movement, or an end location of the virtual object 45 in the movement.

FIG. 3 further illustrates the event system 15 detecting a voice command 320. In this example, the user verbally says "Move the vase right." By this voice command, the user intends to identify the virtual object 45 and move the virtual object 45 to the right relative to the table 35 from the user's viewpoint. The event system 15 can be configured to recognize an intention to identify a virtual object, for example, based on detecting particular nouns such as "vase" that correspond to virtual objects or metadata associated with virtual objects. In this example, metadata of the virtual object 45 includes one or more phrases identifying the virtual object, including the phrase "vase." The event system 15 thus determines that the user 5 is referring to the virtual object 45 by matching the spoken word "vase," with the metadata of the virtual object 45. In the case of ambiguity, the event system 15 may use additional information in the verbal command 320, eye-tracking, or any other additional technique to identify the appropriate virtual object. In another example, the user 5 says "move this right" and the event system 15 detects the word "this," determines that the word is intended to identify an object, and uses an additional technique (e.g., eye tracking, hand tracking, prompting for more input, etc.) to identify the virtual object 45.

In some implementations, the event system 15 is configured to recognize an event type based on the voice command 320. The event system 15 may be configured to detect event type, for example, based on detecting and interpreting particular verbs such as "move" that correspond to changing the location or orientation of virtual objects. In some implementations, the event system 15 maintains a list of verbs and other phrases that correspond to particular event types and uses the list to identify event types. In some implementations, the event system 15 identifies event type using natural language processing or machine learning-based interpretation.

In some implementations, the event system 15 is configured to recognize an intended end position of an intended movement command. The event system 15 may be configured to detect an end position, for example, based on detecting and interpreting particular words or phrases in the voice command 320. For example, the event system 15 may detect the word "right" in the phrase and determine a direction and magnitude of the movement accordingly. The direction or magnitude may be determined based on the user's position (e.g., camera pose) in the CGR environment, the distance from the virtual object, and other factors. The direction or magnitude may be based on default values. For example, the phrases "left," "right," "up," "down," "closer," "away," etc. may be associated with default movement values (e.g., default distances or default percentages of a view, etc.).

After detecting the voice command 320, the event system 15 can change the view of the CGR environment, determine an event (i.e., move event 340), or both. For example, the event system may provide an updated view 350 of the CGR environment that shows the virtual object 45 in its changed location to the right of its previous location from the user's perspective. In another example, the event system 15 provides a sequence of updated views during the movement showing the virtual object 45 moving from its initial position (e.g., as shown in view 300) to an end location (e.g., as shown in view 350).

As with the hand detection example, for voice commands, the event system 15 may create a single event for a movement that identifies the end location of the virtual object 45 or create multiple events corresponding to the movement, for example, identifying one or more intermediate positions during the movement of the virtual object 45.

Similarly, as with the hand detection example, the move event 340 created in response to voice command 320 can include information about the move event 340 that is input-modality independent. For example, the move event 340 may identify the virtual object 45, the app 40*a* associated with the virtual object 45, that the virtual object 45 is being moved, one or more intermediate location of the virtual object 45 in the movement, or an end location of the virtual object 45 in the movement. The move event 340 need not include any input-modality specific information and can thus be the same whether created based on hand detection or voice command detection.

FIG. 3 further illustrates the event system 15 detecting a touch input 330. In this example, the user touches a touch screen with a finger above the virtual object 45 displayed on the touch screen and moves the finger to the right. By this touch input 330, the user intends to identify the virtual object 45 and move the virtual object 45 to the right relative to the table 35 from the user's viewpoint. The event system 15 can be configured to recognize an intention to identify a virtual object, for example, based on detecting a location of a touch on a touch screen corresponding to the location of the virtual object displayed on that screen. The event system 15 can be configured to recognize an event type based on the touch input 330, for example, by detecting the particular touch gesture, e.g., a single touch-based drag movement. Similarly, the event system 15 can be configured to recognize an intended end position of an intended movement gesture, for example, based on the end position of the touch gesture.

After detecting the touch input 330, the event system 15 can change the view of the CGR environment, determine an event (i.e., move event 340), or both. For example, the event system may provide an updated view 350 of the CGR environment that shows the virtual object 45 in its changed location to the right of its previous location from the user's perspective. In another example, the event system 15 provides a sequence of updated views during the movement showing the virtual object 45 moving from its initial position (e.g., as shown in view 300) to an end location (e.g., as shown in view 350).

As with the hand detection and voice command examples, for the touch input 330, the event system 15 may create a single event for a movement that identifies the end location of the virtual object 45 or create multiple events corresponding to the movement, for example, identifying one or more intermediate positions during the movement of the virtual object 45.

Similarly, as with the hand detection and voice command examples, the move event 340 created in response to touch input 330 can include information about the move event 340 that is input-modality independent. For example, the move event 340 may identify the virtual object 45, the app 40*a* associated with the virtual object 45, that the virtual object 45 is being moved, one or more intermediate location of the virtual object 45 in the movement, or an end location of the virtual object 45 in the movement. The move event 340 need not include any input-modality specific information and can thus be the same whether created based on hand detection, voice command detection, touch input detection, or using any other type of input-modality specific detection and interpretation technique or device.

FIG. 4 is a block diagram illustrating the event system 15 of FIG. 2 detecting a user interaction to create an action event and change a view of the CGR environment in accordance with some implementations. In this example, device 10 is a head mounted device (HMD) worn by a user 5. Initially, the user 5 observes view 400 in a display of the device 10. The view 400 of the CGR environment includes the table 35 and the virtual object 45. In this example, the user intends to select the virtual object 45. FIG. 4 illustrates three different user interactions that can be interpreted to accomplish this selection. Each of these three different user interactions involves a different input modality but is interpreted by the event system 15 to create the same event. Accordingly, this event is input-modality independent. An app (e.g., app 40*a* of FIG. 2) that provides the virtual object (e.g., virtual object 45) that is associated with the event can be notified of the event. The app thus need not itself be configured to interpret interactions in different input modalities or otherwise account for input-modality specific user interactions.

FIG. 4 illustrates the event system 15 detecting a hand gesture 410. In this example, the user 5 reaches a hand out to point at the virtual object 45 and holds the hand steady for at least a predetermined about of time. By this hand gesture, the user intends to identify and select the virtual object 45. The event system 15 may detect this gesture via one or more sensors (e.g., a camera, IR sensor, etc.). The event system 15 can be configured to recognize the user's hand and intention to identify the virtual object, for example, using the techniques discussed with respect to FIG. 3. The event system can similarly be configured to detect the event type (e.g., place, action, hover, etc.) by interpreting the hand gesture's characteristics. For example, the event system 15 may determine that the hand being relatively steady for at least a first threshold amount of time is an object identification and that when the hand continues to remain relatively steady for at least an additional threshold amount of time that the gesture is associated with an action type event. Similar to the examples of FIG. 3, the event system 15 further determines whether an event type (e.g., place, action, hover, etc.) is permitted for the virtual object 45 and determines to associate the action event 440 with the virtual object 45 only if the metadata of virtual object 45 indicates that the virtual object 45 is actionable.

After detecting the hand gesture via hand detection 410, the event system 15 can change the view of the CGR environment, determine an event (i.e., action event 440), or both. In this example, the event system 15 does not initially change the view 400. Rather the event system notifies 15 the app 40a and receives information from the app 40a regarding how to respond to the action event 440. In this example, the app 40a provides additional information defining a second appearance of the virtual object 45 and the event system 15 provides updated view 450 with an updated appearance (e.g., showing a larger flower in the vase).

The action event 440 can include information about the action event 340 that is input-modality independent. For example, the move event 340 may identify the virtual object 45, the app 40a associated with the virtual object 45, that object has received an action, or an action type.

FIG. 4 further illustrates the event system 15 detecting a voice command in block 420. In this example, the user verbally says "Select this." By this voice command, the user intends to identify and select the virtual object 45. The event system 15 can be configured to recognize an intention to identify a virtual object and an event type, for example, using the techniques discussed with respect to FIG. 3 (e.g., by interpreting the phrase and using gaze detection). After detecting the voice command in block 420, the event system 15 can change the view of the CGR environment, determine an event (i.e., action event 440), or both. In this example, the event system 15 notifies the app 40a of the action event 440, receives a response from the app 40a, and provides updated view 450 based on the response (e.g., showing a larger flower in the vase).

FIG. 4 further illustrates the event system 15 detecting a touch input 430. In this example, the user 5 touches a touch screen with a finger above the virtual object 45 displayed on the touch screen and presses (e.g., a hard press). The event system 15 can be configured, for example, to recognize an intention to identify a virtual object, for example, based on touch and the event type (e.g., action) based on detecting that the touch is a hard press. After detecting the touch input 430, the event system 15 can change the view of the CGR environment, determine an event (i.e., action event 440), or both. In this example, the event system 15 notifies the app 40a of the action event 440, receives a response from the app 40a, and provides updated view 450 based on the response (e.g., showing a larger flower in the vase).

Figure 5:
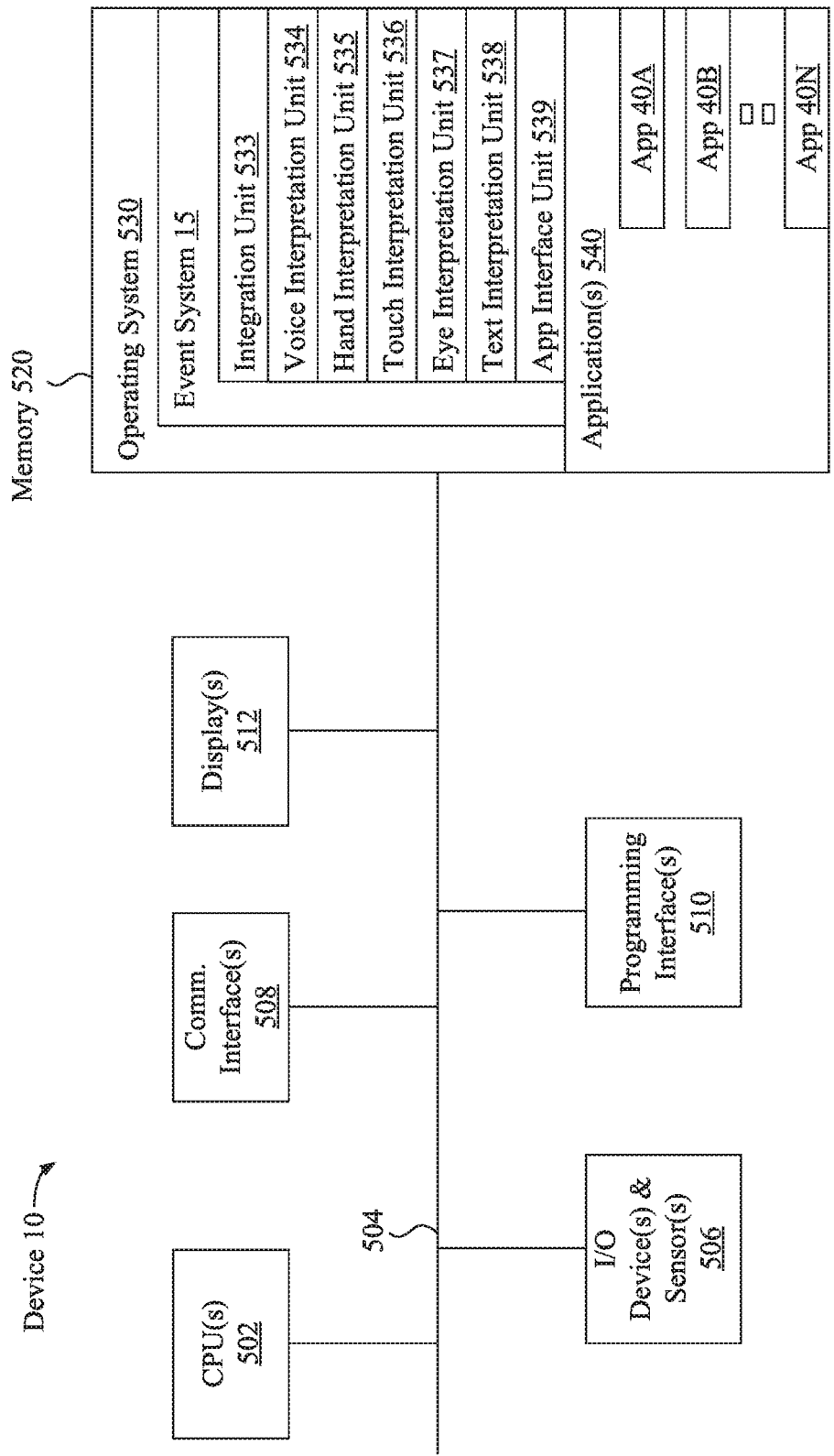
FIG. 5 is a block diagram illustrating device components of an exemplary device according to some implementations.

FIG. 5 is a block diagram illustrating device components of device 10 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 502 (e.g., microprocessors, ASICs, FPGAs, GPUs, CPUs, processing cores, or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, one or more displays 512, and a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more image sensors, one or more microphones, one or more speakers, a haptics engine, one or more depth sensors (e.g., a structured light, a time-of-flight, or the like), or the like. The one or more image sensors can include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensors further include illumination sources that emit light, such as a flash. In some implementations, the data detected by the one or more I/O devices and sensors 506 provides user interaction data to the device 10.

In some implementations, the one or more displays 512 are configured to present a one or more views of a CGR environment. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 512 correspond to diffractive, reflective, polarized, holographic, etc. waveguide displays. In one example, the device 10 includes a single display. In another example, the device 10 includes a display for each eye. In some implementations, the one or more displays 512 are capable of presenting MR or VR content.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and one or more applications (apps 540a-n). The operating system 530 includes procedures for handling various basic system services and for performing hardware dependent tasks.

In some implementations, an event system 15 is included on device 10, for example, as part of operating system 530. The event system 15 includes an integration unit 533 for generating a CGR environment and/or views of a CGR environment using data from multiple sources, e.g., real world data from a camera and virtual objects from one or more apps. 40*a-n*. The event system 15 further includes a voice interpretation unit 534 for interpreting voice detected via a microphone or other device, a hand interpretation unit 535 for interpreting finger, hand, or body gestures detected by a device, a touch interpretation unit 536 for interpreting touch receives on a touch screen or similar device, an eye interpretation unit for interpreting eye position or gaze detected by an eye monitoring device, and a text interpretation unit for interpreting text receives via a devices such as a keyboard. These units 534-538 are configured to identify events based on user interactions received via sensor data. The event system 15 further includes an app interface unit 539 for receiving information from apps 40*a-n* such as virtual object information and exchanging information with apps 40*a-n* regarding the user interactions that are interpreted as events by units 534-535.

FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The units 533-539 thus can be implemented collectively or individually in one or more systems, sub-systems, applications, files, modules, routines, procedures or other computer-implemented instruction units. The actual number of units and the division of particular functions and how features are allocated among them will vary from one implementation to another and, in some implementations, depends in part on the particular combination of hardware, software, or firmware chosen for a particular implementation.

Figure 6:
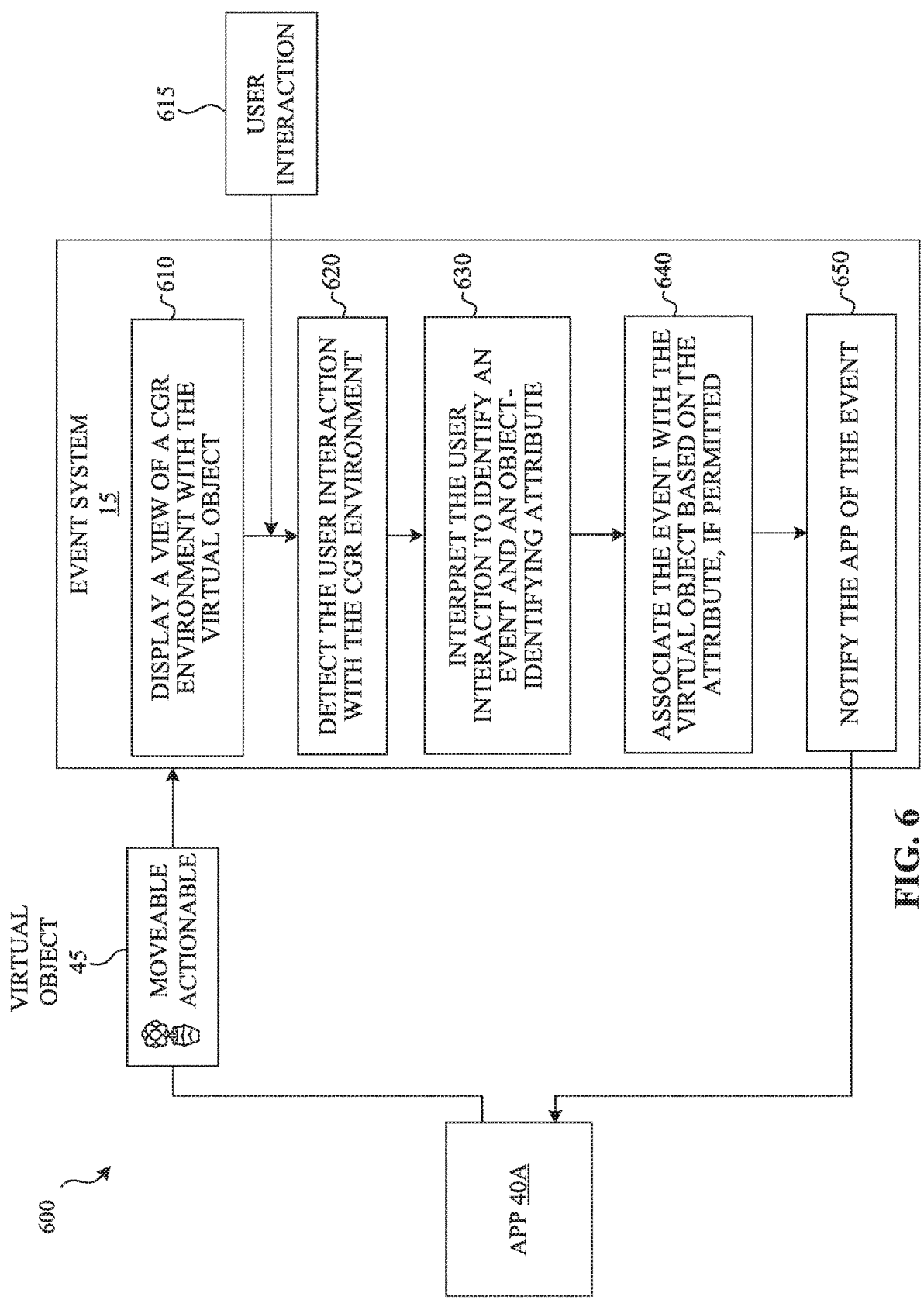
FIG. 6 is a block diagram illustrating an exemplary event detection and notification process according to some implementations.

FIG. 6 is a block diagram illustrating an exemplary event detection and notification method 600 according to some implementations. In some implementations, the method 600 is performed by a device (e.g., device 10 of FIGS. 1-5). The method 600 can be performed at a mobile device, HMD, desktop, laptop, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

In FIG. 6, app 40*a* provides a virtual object 45 to the event system 15 so that the virtual object will be included in views of a CGR environment that is presented. At block 610, the method 600 displays a view the CGR environment that includes the virtual object 45. At block 615, a user interaction (e.g., sensor data about a user interaction) is received at the event system 15. For example, the event system 15 may receive data from the one or more of I/O device(s) and sensor(s) 506 of FIG. 5.

At block 620, the method 600 detects the user interaction 615 with the CGR environment. For example, voice data may be continuously monitored to identify any phrases within the voice data that correspond to commands specifying a user interaction with the CGR environment. In another example, camera data is analyzed to identify fingers, hands, or other user body parts and identify when such body parts are positioned or moved in a way that indicates a command specifying a user interaction with the CGR environment. Additional examples were discussed with respect to FIGS. 3 and 4.

At block 630, the method 600 interprets the user interaction 615 to identify an event and an object-identifying attribute. For example, a voice command may be parsed and interpreted to identify that the command corresponds to a move event. The voice command may additionally be parsed to identify an object name/type, e.g., "vase," object location in the CGR environment, e.g., by determining where the user's hand is pointing, etc.

At block 640, the method 600 associates the event with the virtual object based on the attribute, if permitted. For example, the event system 15 may determine that the user is pointing in a particular direction and identify the virtual objects that are close to the direction the user is pointing. The event system 15 then identifies one of those virtual objects to associate with the event if the virtual object is permitted to be associated with that event. For example, the event system 15 will only associate a move event with a virtual object if that object is moveable. If not, the event system will attempt to identify another object that is moveable. If no moveable object can be identified, e.g., within a threshold distance of where the user is pointing, the event system 15 can prompt the user for more input or simply wait for additional input. In an alternative implementation or for particular events, event types, or circumstances, the event system instead detects an event and sends information about the event to one or more apps and each app determines whether it is permitted, or otherwise capable of, responding to the event.

At block 650, the method 600 notifies the app of the event. For example, the event system 15 may change the view to move a virtual object after interpreting a user interaction as a move event and then notify the app that provided the virtual object that the virtual object has been moved or that movement of the virtual object has begun. In other examples, the event system 15 will notify the app of an event without first moving or otherwise changing the view of the CGR environment. Notifying the app of the event can involve sending the same event data set to the app representing the event regardless of the input modality associate with the event, e.g., the event data set is the same for different input modalities.

Figure 7:
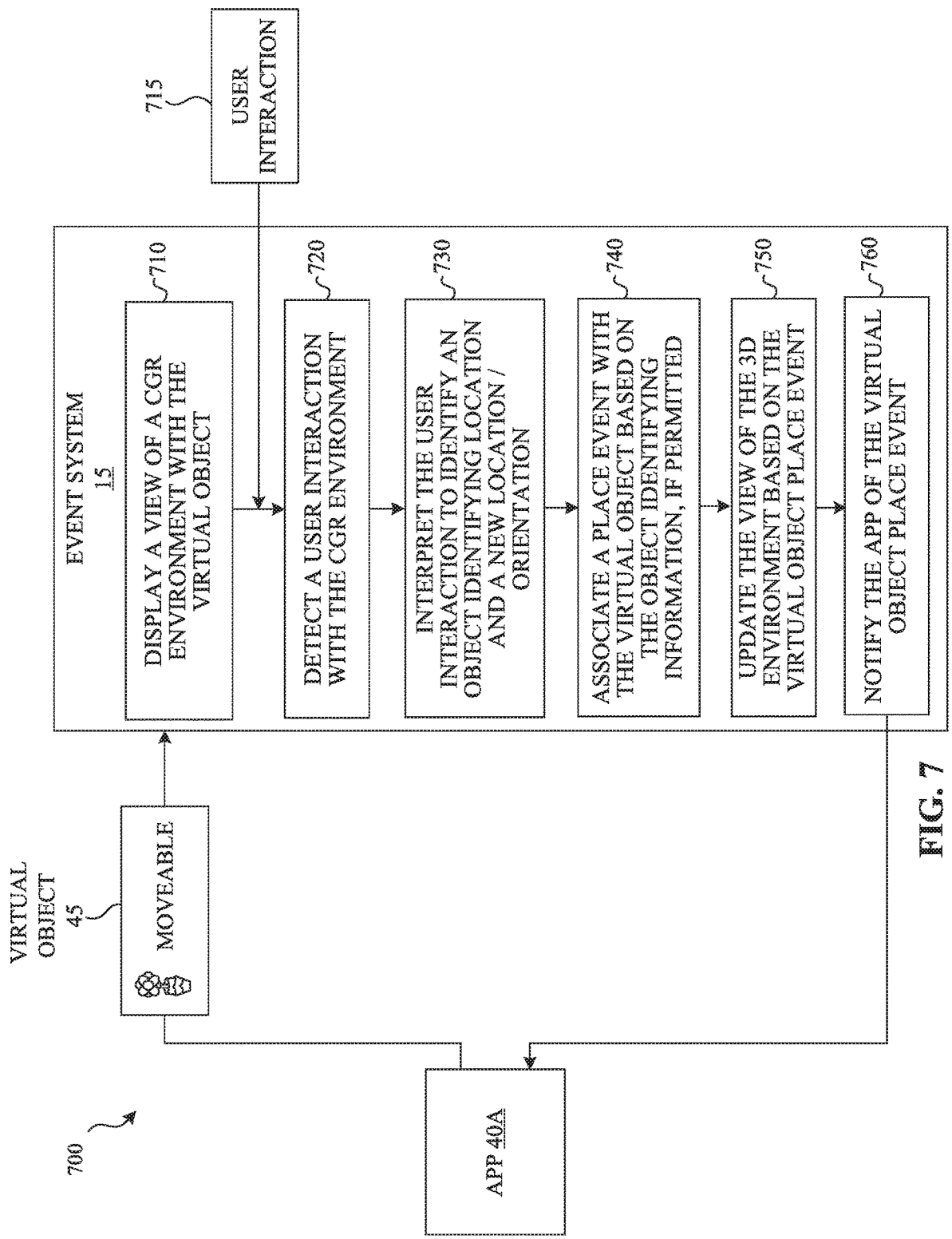
FIG. 7 is a block diagram illustrating an exemplary move event detection and notification process according to some implementations.

FIG. 7 is a block diagram illustrating an exemplary move event detection and notification process according to some implementations. In some implementations, the method 700 is performed by a device (e.g., device 10 of FIGS. 1-5). The method 700 can be performed at a mobile device, HMD, desktop, laptop, or server device. In some implementations, the method 700 is performed by processing logic, including hardware, firmware, software, or a combination thereof. In some implementations, the method 700 is performed by a processor executing code stored in a non-transitory computer-readable medium (e.g., a memory).

In FIG. 7, app 40*a* provides a virtual object 45 along with a UI capability (moveable) to the event system 15 so that the virtual object 45 will be included in views of a CGR environment that is presented and treated as a moveable object. At block 710, the method 700 displays a view the CGR environment that includes the virtual object 45. At block 715, a user interaction (e.g., sensor data about a user interaction) is received at the event system 15. For example, the event system 15 may receive data from the one or more of I/O device(s) and sensor(s) 506 of FIG. 5. At block 720, the method 700 detects the user interaction 715 with the CGR environment.

At block 730, the method 700 interprets the user interaction to identify the virtual object and a change of position or orientation of the virtual object. In one example, the virtual object the user interaction identifies a location and the event system identifies the virtual object by identifying that the virtual object is located at or near that location. For example, a voice command may be parsed and interpreted to identify that the command corresponds to an object the user is gazing at when the command is uttered. Eye-detection data is interpreted to determine that the user is gazing in a particular gaze direction. This gaze direction can be used to determine an object-identifying location in the CGR environment, e.g., all locations along the path of the gaze. A new location/orientation corresponding to an intermediate or end location of a virtual object to be moved is similarly determined by interpreting the user interaction data. For example, the event system may identify the new location by gaze direction or a new orientation based on spoken words (e.g., "spin," turn right," "flip," etc.).

At block 740, the method 700 associates the event with the virtual object 45. For example, the event system 15 may determine that the user is pointing in a particular direction, identify locations in the CGR environment corresponding to that direction, and identify any virtual objects that are close to the direction the user is pointing. Objects that are nearer to the user may be given priority. The event system 15 identifies one of those virtual objects to associate with the move event if the virtual object is permitted to be associated with the move event.

At block 750, the method 700 updates the view of the CGR environment based on the virtual object move event. For example, if the move event specifies moving the virtual object 45 from position x1, y1, z1, to position x2, y2, z2, the event system moves the object to position x2, y2, z2 in the virtual environment and creates a new view of the updated CGR environment. At block 760, the method 700 notifies the app of the move event. For example, the event system 15 may notify the app 40a that provided the virtual object 45 that the virtual object 45 has been moved or that movement of the virtual object 45 has begun.

Figure 8:
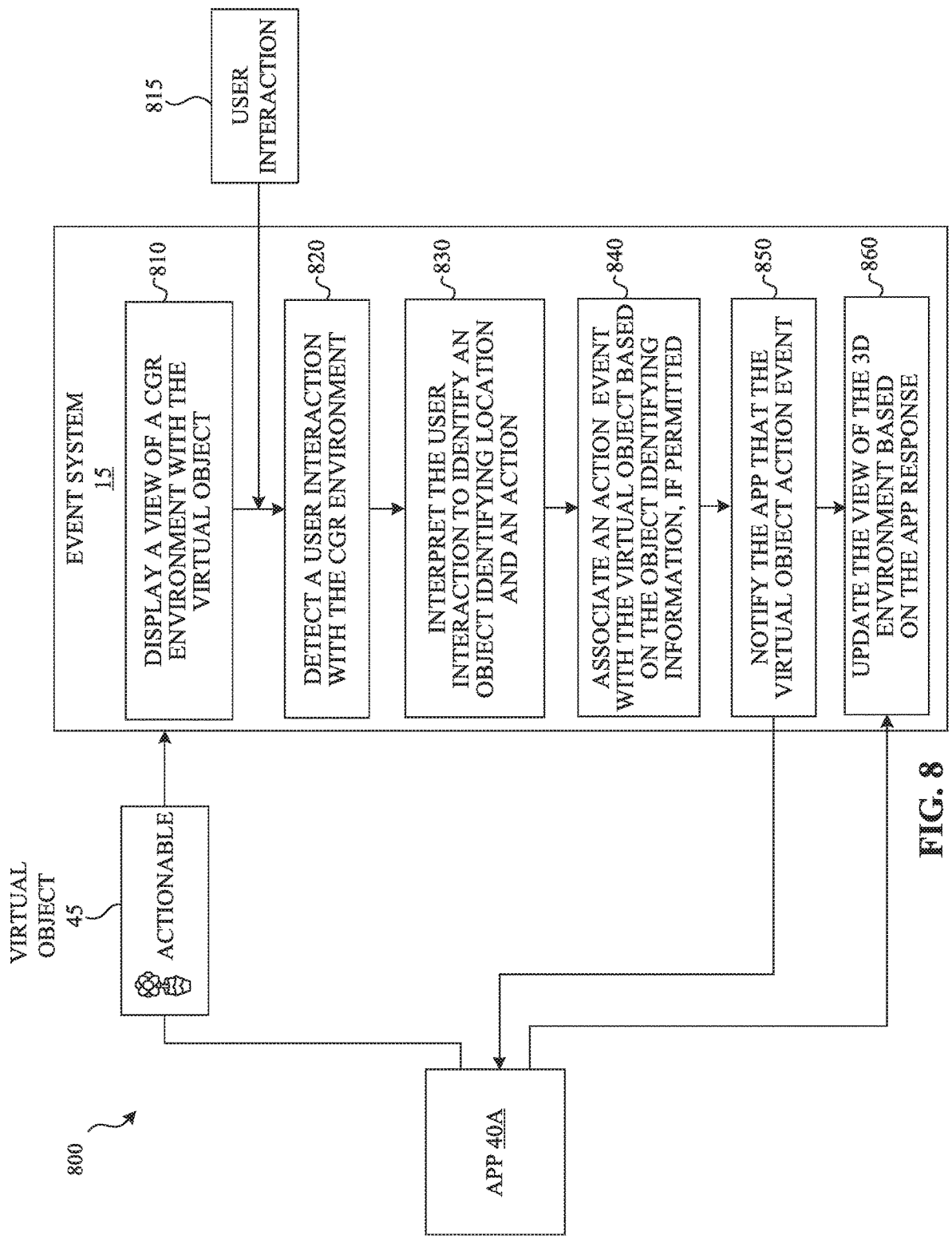
FIG. 8 is a block diagram illustrating an exemplary action event detection and response process according to some implementations.

FIG. 8 is a block diagram illustrating an exemplary action event detection and response process according to some implementations. In some implementations, the method 800 is performed by a device (e.g., device 10 of FIGS. 1-5). The method 800 can be performed at a mobile device, HMD, desktop, laptop, or server device. In some implementations, the method 800 is performed by processing logic, including hardware, firmware, software, or a combination thereof. In some implementations, the method 800 is performed by a processor executing code stored in a non-transitory computer-readable medium (e.g., a memory).

In FIG. 8, app 40a provides a virtual object 45 along with a UI capability (actionable) to the event system 15 so that the virtual object will be included in views of a CGR environment that is presented and treated as an actionable object. At block 810, the method 800 displays a view the CGR environment that includes the virtual object 45. At block 815, a user interaction (e.g., sensor data about a user interaction) is received at the event system 15. For example, the event system 15 may receive data from the one or more of I/O device(s) and sensor(s) 506 of FIG. 5. At block 820, the method 800 detects the user interaction 815 with the CGR environment.

At block 830, the method 800 interprets the user interaction 815 to identify an object identifying location and an action. In some implementations, the user interaction corresponding to an action is determined by interpreting the user interaction data. For example, the data may include a particular keyword such as "select," "open," "view," "expand," and the like or may include a particular hand gesture, eye gaze, touch command, or combination thereof.

At block 840, the method 800 associates the event with the virtual object 45 based on the object identifying information, if permitted. The event system 15 thus identifies a virtual object 45 based on the object-identifying information to associate with the action event so long as the virtual object 45 is permitted to be associated with the action event.

At block 850, the method 800 notifies the app of the action event. For example, the event system 15 may notify the app 40a that provided the virtual object 45 that the virtual object 45 has been actioned. At block 860, the method 800 updates the view of the CGR environment based on the app's response to being notified of the action event. For example, the app may respond that five additional virtual objects should be displayed around virtual object 45 and provide appearance and UI capability information for those virtual objects to be displayed in the updated view of the CGR environment. The app 40a may further specify the location of those virtual object relative to the virtual object 45, one another, or the CGR environment.

In addition to moveable and actionable, other exemplary UI capabilities include, but are not limited to, hover-able, transformable, physical, attachable, and accessible. The hover-able UI capability relates to events triggered by proximity or use of an object. For example, when a user is close to a virtual object in the CGR environment for example by reaching a hand close to but not touching the virtual object, the hover event may be detected and used to trigger a change, e.g., a highlighting of the virtual object, etc. Hoverable can also be used indicate which nearby virtual objects are actionable. In one example, there is a displayed text field and the hover state is triggered when the user looks at or reaches for the field but before the user provides input, e.g., voice, to populate the field.

The transformable UI capability can relate to scaling of a virtual object, for example, being triggering when a user interaction changes the scale of a virtual object.

The physical UI capability can relate to whether other objects can interact with/collide with a virtual object.

The attachable UI capability can enable a virtual object to attach to real world object or other virtual objects. Such objects can thus receive attach type events.

The accessible UI capability can enable additional interactions with a virtual object to make a virtual object more accessible by blind and handicapped users.

Figure 9:
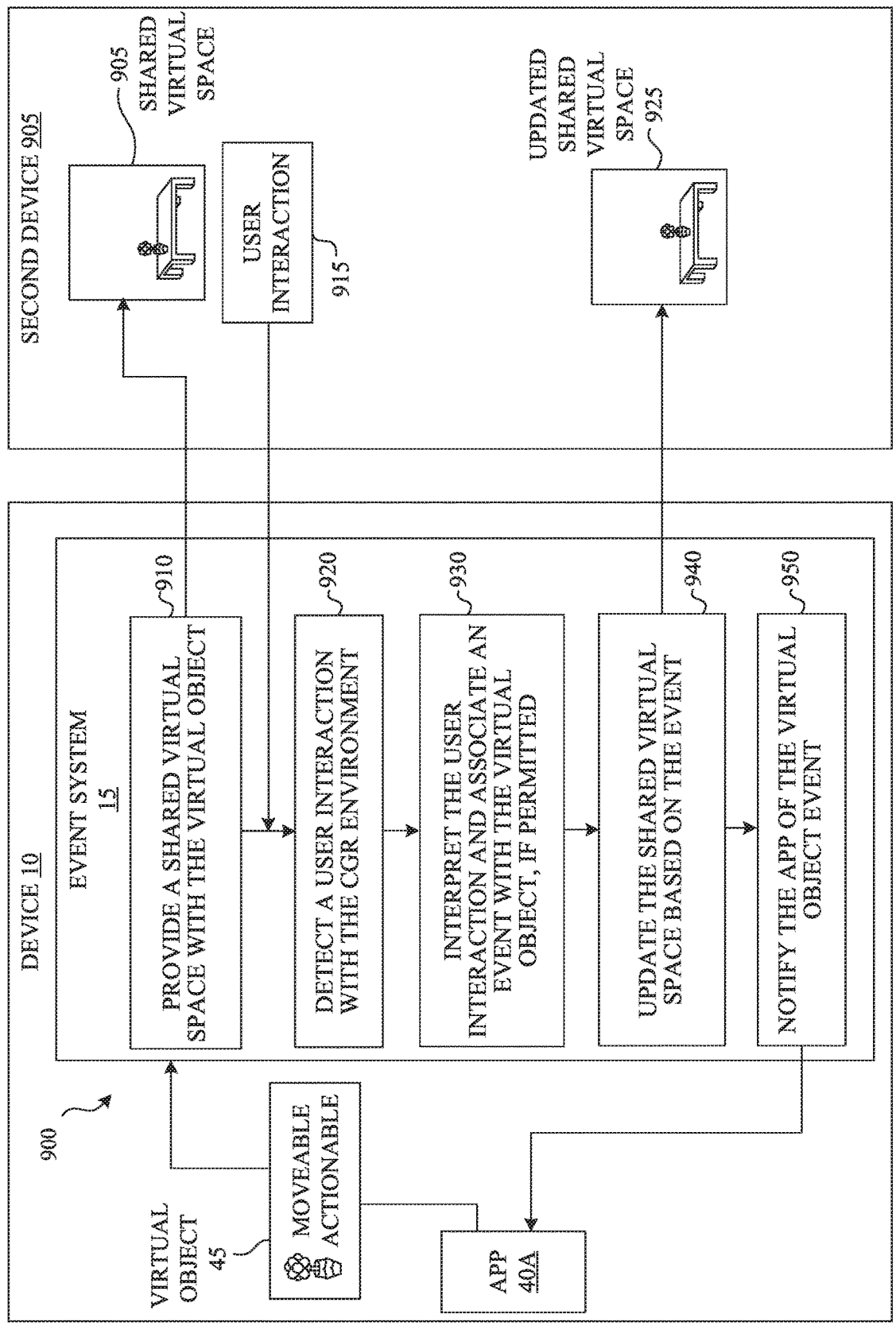
FIG. 9 is a block diagram illustrating an exemplary multi-device event detection and notification process according to some implementations.

FIG. 9 is a block diagram illustrating an exemplary multi-device event detection and notification process according to some implementations. In some implementations, the method 900 is performed by a device (e.g., device 10 of FIGS. 1-5) interacting with a second device (e.g., device 905 in FIG. 9). The method 900 can be performed via one or more mobile devices, HMDs, desktops, laptops, or server devices. In some implementations, the method 900 is performed by processing logic, including hardware, firmware, software, or a combination thereof. In some implementations, the method 900 is performed by a processor executing code stored in a non-transitory computer-readable medium (e.g., a memory).

In FIG. 9, app 40a provides a virtual object 45 to the event system 15 along with its UI capability (e.g., moveable, actionable, etc.) so that the virtual object will be included in views of a CGR environment that are presented. At block 910, the method 900 displays a view the CGR environment that includes the virtual object 45. In this example, the device 10 provides a shared virtual space that includes the virtual object. The shared virtual space can include virtual objects provided by one or more apps and can be shared with one or more other devices, such as device second 905. The virtual objects in the shared virtual space can be provided by either device, e.g., by either device 10 or second device 905.

At block 915, the second device 905 provides a user interaction 915 (e.g., sensor data about a user interaction) that is received at the event system 15 of the device 10. For example, the event system 15 may receive data that originated from one or more of I/O device(s) and sensor(s) of the second device 905, which may be operated by a user different from the user 5 operating device 10.

At block 920, the method 900 detects the user interaction 915 with the CGR environment, for example, by interpreting the data using one or more of the techniques disclosed herein. At block 930, the method 900 interprets the user interaction and associates an event with the virtual object, if permitted. The interpretation and association can involve the techniques disclosed herein while also taking into account to different source of the user interaction. Thus, a user interaction from the second device 905 will be detected and interpreted in light of the characteristics of the second device's user interaction, e.g., second user position (e.g., camera pose) in the view used by the second device 905, second user device distance from the virtual objects, etc. In one example, the event system 15 determines that the second user has provided input to move a virtual chess piece. The event system determines that this is permitted by determining that the virtual object 45 is a moveable virtual object of the app 40a on the device 10.

At block 940, the method 900 updates the shared virtual space based on the event. This can occur prior to notifying the app 40a of the move event. This results in updated shared virtual space 925, which is included in any updated views provided on device 10 or second device 900. At block 950, the event system 15 notifies the app 40a of the move event and the app 40a can determine to respond or not respond based on its own instructions. In one example, the app 40a determines to respond by changing or otherwise updating the one or more virtual objects that it is providing to the shared virtual space.

The event detection methods and systems disclosed herein provide numerous advantages. The event system 15 can abstract user interaction data from varied input modalities into higher-level input-modality independent events (e.g., move events, action events, hover events, etc.) that can more easily be used by apps. The app or apps that are providing virtual objects used by such a system do not need to include input modality-specific instructions. For example, an app need does not need to include hit detection, hand movement interpretation, voice interpretation features, touch interpretation features, gesture conflict resolution, resolve scenarios in which content from multiple apps from potentially multiple devices is intermingled in a shared virtual space, etc. The app can instead simply include instructions that use the received input-modality independent events. The app does not need to be updated to accommodate new and changing input modalities that result in the event. Additionally, the system can be configured to itself change virtual objects using the events, for example moving a virtual object to a new location/orientation in response to detecting a user interaction and without waiting for round-trip messaging with the app. This may provide improved, more realistic responses to user interactions, particularly in the context of CGR environments, e.g., VR and MR, in which interpreting user interactions can be more complicated and in which quick response to such user interactions can be more critical for realistic experiences.

The event system 15 can also provide efficiency and accuracy by avoiding the need to send user interaction data to multiple apps. If there are three apps open and providing virtual objects in a shared virtual space from one or more devices, and the user says "move this left," the command can be interpreted once by the event system rather than separately by the multiple apps and devices. Moreover, this avoids the possibility of multiple apps or devices claiming the user interaction.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an event system on a device having a processor, a computer-readable storage medium, and a display:
    displaying a view of a computer-generated reality (CGR) environment on the display, the CGR environment comprising a plurality of virtual objects provided by a plurality of applications separate from the event system, wherein an application defines an appearance or function of a virtual object of the plurality of virtual objects and identifies a user interface (UI) capability of the virtual object to the event system, the UI capability indicative of whether one or more events are permitted for the virtual object;
    detecting user interactions with the CGR environment;
    interpreting the user interactions to identify events and an object-identifying attributes of the user interactions, the object-identifying attributes corresponding to locations;
    associating the events with virtual objects of the plurality of virtual objects based on identifying the virtual objects using the object-identifying attributes and determining that the virtual objects permit the events based on the UI capabilities of the virtual objects; and
    notifying applications of the plurality of applications of the events,
    wherein the applications respond to the user interactions with the virtual objects that each respectively provided in the CGR environment:
        based on being notified by the event system of the events corresponding to the user interactions; and
        without the applications utilizing input-modality-specific user interaction handling instructions to interpret at least some of the user interactions.

2. The method of claim 1, wherein interpreting the user interaction to identify the event comprises determining whether the user interaction is among a plurality of user interactions associated with the event, wherein the plurality of user interactions have different input modalities, wherein the different input modalities include hand-gesture input, eye-movement input, or voice input.

3. The method of claim 1, wherein notifying the application of the event comprises sending an event data set to the application, wherein the event data set is the same for different input modalities.

4. The method of claim 1, wherein the UI capability identifies that the virtual object is moveable in the CGR environment, wherein the event represents movement of the virtual object within the CGR environment, wherein interpreting the user interaction comprises:
    identifying a location specified by the user interaction and identifying the virtual object at the location; or
    identifying a change of position or orientation for the virtual object in the CGR environment based on the user interaction, wherein the event system relocates or reorients the virtual object in the CGR environment based on the identified change.

5. The method of claim 1, wherein the UI capability identifies that the virtual object is action-able, wherein the event is an action on the virtual object, wherein the action on the virtual object comprises a selection based on hand-gesture input data, eye-movement detection data, a voice command, or a touch-screen input.

6. The method of claim 1, wherein notifying the application of the event comprises notifying the application of the action, wherein the application provides a response to the action.

7. The method of claim 1, wherein the CGR environment comprises virtual objects provided from multiple applications, wherein the multiple applications execute separately from one another.

8. The method of claim 1, wherein the application executes separately from the event system.

9. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
    displaying a view of a computer-generated reality (CGR) environment on the display, the CGR environment comprising a plurality of virtual objects provided by a plurality of applications separate from the event system, wherein an application defines an appearance or function of a virtual object of the plurality of virtual objects and identifies a user interface (UI) capability of the virtual object to the event system, the UI capability indicative of whether one or more events are permitted for the virtual object;
    detecting user interactions with the CGR environment;

interpreting the user interactions to identify events and an object-identifying attributes of the user interactions, the object-identifying attributes corresponding to locations;
associating the events with virtual objects of the plurality of virtual objects based on identifying the virtual objects using the object-identifying attributes and determining that the virtual objects permit the events based on the UI capabilities of the virtual objects; and
notifying applications of the plurality of applications of the events to enable those applications to respond to the user interactions with the virtual objects that each respectively provided in the CGR environment:
based on being notified by the event system of the events corresponding to the user interactions; and
without the applications utilizing input-modality-specific user interaction handling instructions to interpret at least some of the user interactions.

10. The system of claim 9, wherein interpreting the user interaction to identify the event comprises determining whether the user interaction is among a plurality of user interactions associated with the event, wherein the plurality of user interactions have different input modalities.

11. The system of claim 9, wherein notifying the application of the event comprises sending an event data set to the application, wherein the event data set is the same for different input modalities.

12. The system of claim 9, wherein the UI capability identifies that the virtual object is moveable in the CGR environment, wherein the event represents movement of the virtual object within the CGR environment, wherein interpreting the user interaction comprises:
identifying a location specified by the user interaction and identifying the virtual object at the location; or
identifying a change of position or orientation for the virtual object in the CGR environment based on the user interaction, wherein the system is configured to relocate or reorient the virtual object in the CGR environment based on the identified change.

13. The system of claim 9, wherein the UI capability identifies that the virtual object is action-able, wherein the event is an action on the virtual object.

14. A non-transitory computer-readable storage medium, storing program instructions executable on a computer to perform operations comprising:
displaying a view of a computer-generated reality (CGR) environment on the display, the CGR environment comprising a plurality of virtual objects provided by a plurality of applications separate from the event system, wherein an application defines an appearance or function of a virtual object of the plurality of virtual objects and identifies a user interface (UI) capability of the virtual object to the event system, the UI capability indicative of whether one or more events are permitted for the virtual object;
detecting user interactions with the CGR environment;
interpreting the user interactions to identify events and an object-identifying attributes of the user interactions, the object-identifying attributes corresponding to locations;
associating the events with virtual objects of the plurality of virtual objects based on identifying the virtual objects using the object-identifying attributes and determining that the virtual objects permit the events based on the UI capabilities of the virtual objects; and
notifying applications of the plurality of applications of the events,
wherein the applications respond to the user interactions with the virtual objects that each respectively provided in the CGR environment:
based on being notified by the event system of the events corresponding to the user interactions; and
without the applications utilizing input-modality-specific user interaction handling instructions to interpret at least some of the user interactions.

15. The non-transitory computer-readable storage medium of claim 14, wherein interpreting the user interaction to identify the event comprises determining whether the user interaction is among a plurality of user interactions associated with the event, wherein the plurality of user interactions have different input modalities, wherein the different input modalities include hand-gesture input, eye-movement input, or voice input.

16. The non-transitory computer-readable storage medium of claim 14, wherein notifying the application of the event comprises sending an event data set to the application, wherein the event data set is the same for different input modalities.

17. The non-transitory computer-readable storage medium of claim 14, wherein the UI capability identifies that the virtual object is moveable in the CGR environment, wherein the event represents movement of the virtual object within the CGR environment, wherein interpreting the user interaction comprises: identifying a location specified by the user interaction and identifying the virtual object at the location; or identifying a change of position or orientation for the virtual object in the CGR environment based on the user interaction, wherein the event system relocates or reorients the virtual object in the CGR environment based on the identified change.

18. The non-transitory computer-readable storage medium of claim 14, wherein the UI capability identifies that the virtual object is action-able, wherein the event is an action on the virtual object, wherein the action on the virtual object comprises a selection based on hand-gesture input data, eye-movement detection data, a voice command, or a touch-screen input.

19. The non-transitory computer-readable storage medium of claim 14, wherein associating the event with the virtual object is further based on determining that the event is not permitted for a second virtual object based on second UI capabilities identified for the second virtual object.

20. The non-transitory computer-readable storage medium of claim 19, wherein a second application defines a second appearance or second function of the second virtual object and identifies the second user interface (UI) capability of the second virtual object, the second UI capability indicative of whether one or more events are permitted for the second virtual object, wherein the second application executes separately from the first application.

* * * * *